J. T. HICKMAN, Jr.
POWER DRIVEN FARMING IMPLEMENT.
APPLICATION FILED MAR. 1, 1920.
1,386,783.
Patented Aug. 9, 1921.
3 SHEETS—SHEET 1.
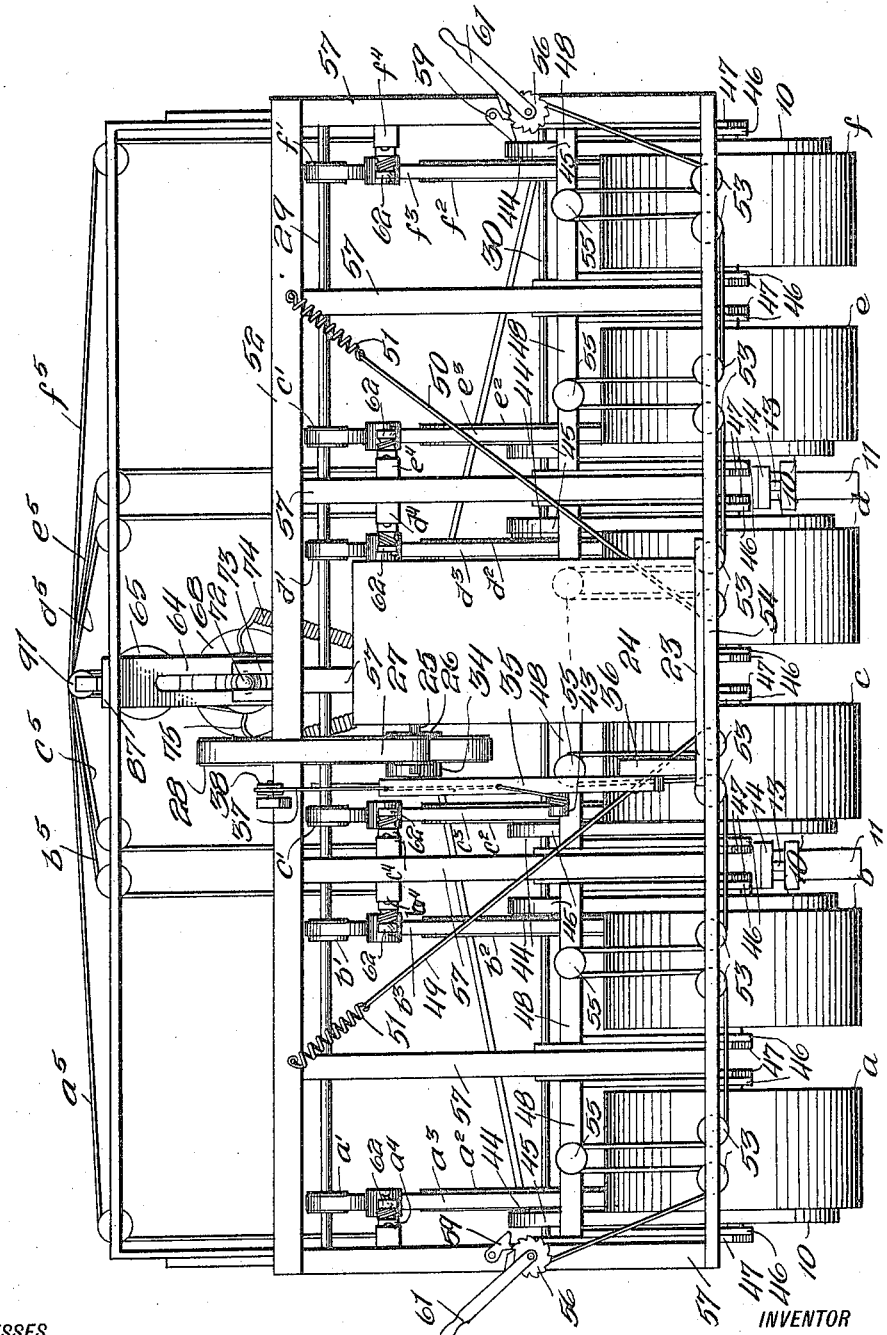

J. T. HICKMAN, Jr.
POWER DRIVEN FARMING IMPLEMENT.
APPLICATION FILED MAR. 1, 1920.
1,386,783.
Patented Aug. 9, 1921.
3 SHEETS—SHEET 2.
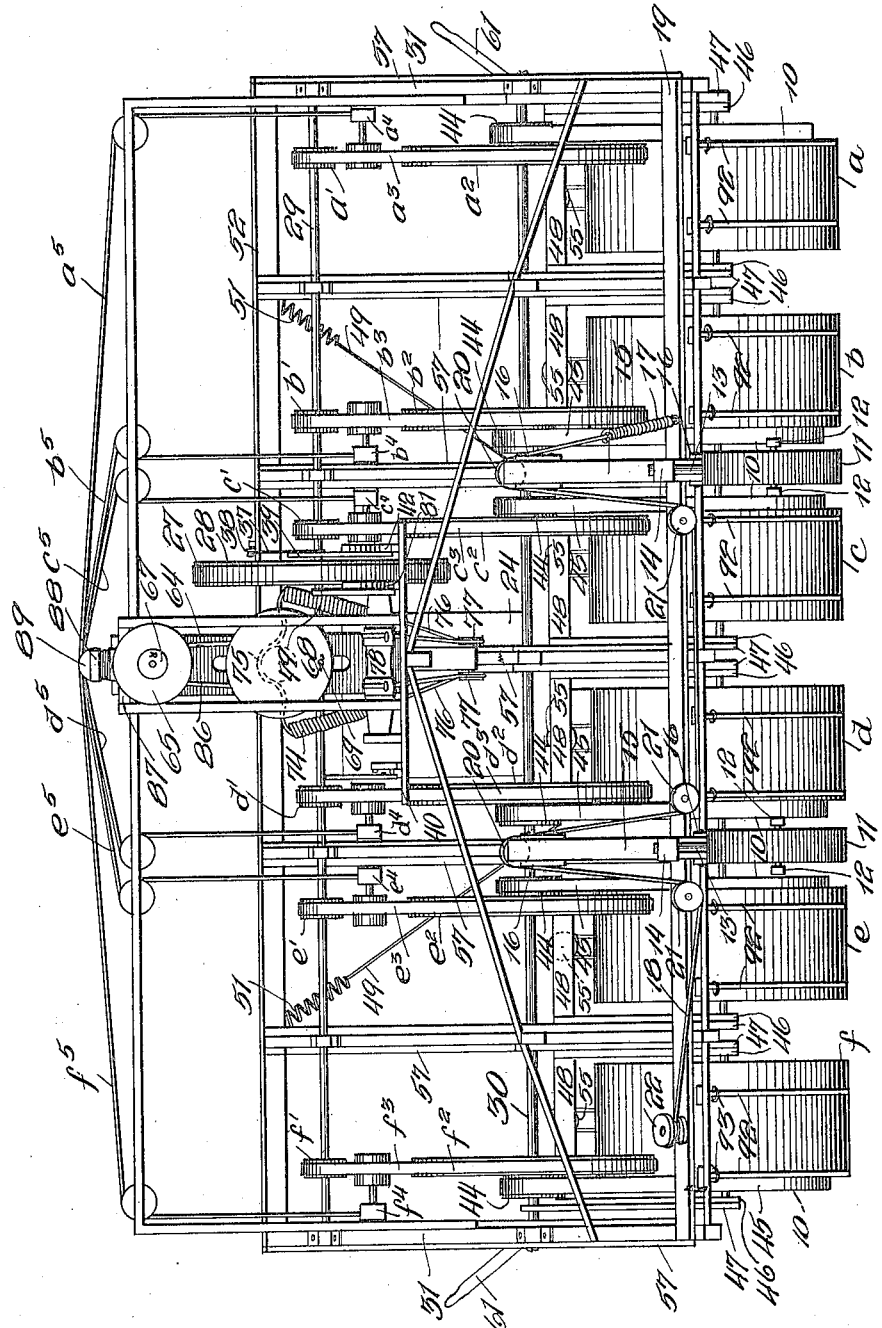
WITNESSES
Wynne Johnson
INVENTOR
James T. Hickman, Jr.
BY
Munn &Co.
ATTORNEYS

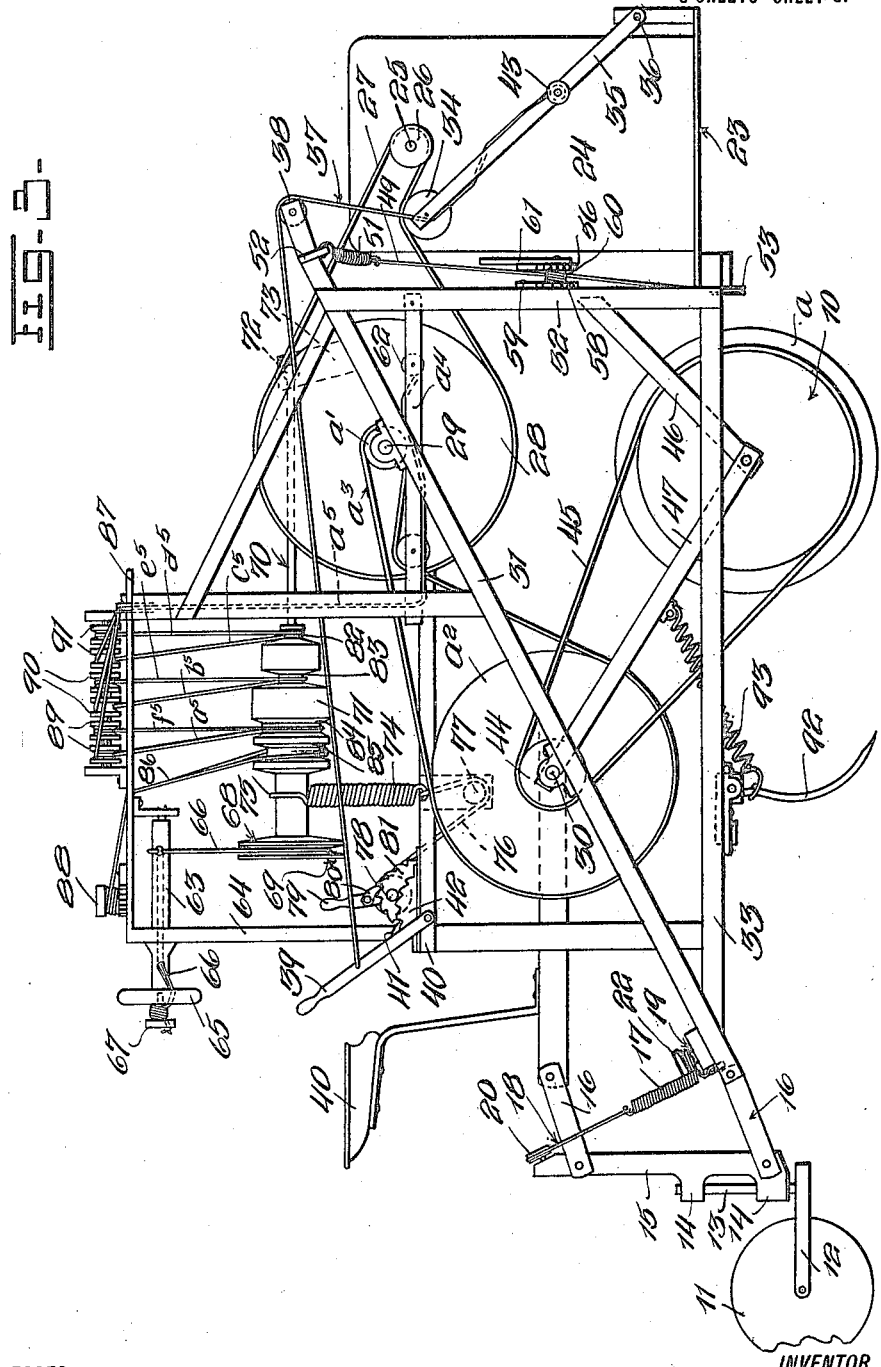

UNITED STATES PATENT OFFICE.

JAMES T. HICKMAN, JR., OF SPRINGPORT, INDIANA.

POWER-DRIVEN FARMING IMPLEMENT.

1,386,783.  Specification of Letters Patent.  Patented Aug. 9, 1921.

Application filed March 1, 1920. Serial No. 362,487.

*To all whom it may concern:*

Be it known that I, JAMES T. HICKMAN, Jr., a citizen of the United States, and a resident of Springport, in the county of Henry and State of Indiana, have made certain new and useful Improvements in Power-Driven Farming Implements, of which the following is a specification.

My present invention relates generally to farming implements and more particularly to a power driven implement of the nature described and claimed in my Patent No. 1,231,352, granted June 26, 1917, upon which the present application is an improvement particularly with respect to the directional control and use of the machine in practice.

The main object of my present invention is to increase the range of use of the machine and bring about delicate directional control so that it can be turned practically in its own length, with ease and facility, and further objects relate to the mounting of the ground wheels or rollers whereby the machine may proceed without difficulty over uneven, rocky soil, avoiding injury from the encountering of obstacles and in this way increase its life and general usefulness in practice.

In the accompanying drawings illustrating my present improvements:—

Figure 1 is a front elevation,

Fig. 2 is a rear elevation, and

Fig. 3 is a side elevation.

Referring now to these figures, the main frame of my machine as illustrated is supported by means of a forward transverse series of alined laterally spaced ground rollers or wheels 10, in the present instance, shown in the nature of smooth faced rollers of substantial width, each of which, it is to be understood, may be provided with peripheral ribs, spikes or the like as in my patent above referred to, in order to both increase the tractive qualities of the machine and work the ground as the machine passes thereover. This is particularly true of plowed ground in connection with which a machine of the present type may be utilized without the disadvantages of soil packing incident to the ordinary tractor as well as horse drawn machines.

The main frame is also supported in practice by a pair of trailing wheels 11, each of which is journaled in a fork 12 which is best seen in Fig. 3, having an upright post 13 journaled and freely revoluble in the bearings 14 of an upright bracket 15, the latter being vertically shiftable with respect to the main frame through its connection thereto by vertically spaced pivoted links 16, both of the wheels being thus shiftable vertically with respect to the main frame at its rear portion and being under tension and control of a spring 17 at one end of a flexible connection 18.

This flexible connection extends, from one end of the spring 17, the opposite end of which is anchored upon a rear transverse bar 19 of the main frame, downwardly over rollers 20, carried by the uprights 15 and upwardly around rollers 21 carried by the said frame bar 19 as best seen in Fig. 2. The opposite end of the flexible connection or cable 18 extends around an adjusting spool 22 and this spool is revolubly adjustable on the frame bar 19 so that all slack in the flexible connection may be taken up from time to time.

Upon a front platform 23 of the frame is a motor 24, the illustration of which is wholly conventional and the drive shaft 25 of which carries a pulley 26 around which the forward end of the main belt 27 is extended. This belt passes at its rear end around an enlarged pulley 28 on the upper forward line shaft 29, the latter of which like the lower rear line shaft 30 is journaled, at its ends in bearings mounted upon the upper side bars 31 of the main frame which incline rearwardly and downwardly from the upper ends of the forward uprights 32 to the rear ends of the lower horizontal bars 33 where they connect to the transverse frame bar 19 previousy mentioned.

The main belt 27 is engaged at a point between the pulleys 26 and 28, by a roller 34 at the upper rear end of a belt tightening lever 35, the latter being pivotally mounted at its lower forward end at 36 upon a portion of the platform 23 and being under control of a flexible connection 37 extending upwardly and rearwardly from a guide roller 38 with its end connected to a control lever 39 pivotally mounted in the main frame adjacent to the driver's seat 40 and having a latch 41 in the nature of a pawl engaging a stationary notched quadrant 42. The forward end of the flexible connection 37 extends through kerfs in the lever 34, above mentioned, and is wound at its forward extremity upon a rotatably adjustable spool 43 carried by the lever and by means of which the flexible connection may be adjusted and any slack taken up.

Rotary motion is conveyed from the upper forward line shaft 29, driven from the motor 24 through the connections just described, to the lower rear line shaft 30 by means of a plurality of small pulleys on the first mentioned shaft and a plurality of larger pulleys on the last mentioned shaft with belts independently connecting each small pulley with its respective large pulley, each pair of pulleys so connected being alined with their respective ground wheel or roller 10.

For convenience in description and in view of the steering control, each pair of pulleys of the respective ground wheels or rollers will be given a separate character in Figs. 1 and 2, the ground rollers being lettered from $a$ to $f$ and the small and large pulleys and belt of each being given the same letter respectively with the numerals 1, 2 and 3. Thus, the smaller pulley $a'$ connects with the larger pulley $a^2$ by a belt $a^3$ for the ground roller or wheel $a$.

In addition to these connections, each of the large pulleys, which is loose on the line shaft 30 has a small side pulley 44 secured thereto and connected by a belt 45 with its respective ground roller or wheel and each of these ground rollers or wheels is mounted in a generally U-shaped ground wheel frame consisting of angularly disposed and connected front and rear side bars 46, 47, the former of which are connected by a cross bar 48 and the latter of which are journaled at their rear ends upon the rear line shaft 30, so that each ground roller or wheel, with its frame, may swing vertically and independently of the other rollers or wheels. This movement is, however, under control of flexible connections 49, 50, each of which controls half of the series of ground wheels and is connected at its inner end to a tension spring 51 anchored on the upper forward cross bar 52 of the main frame as particularly seen in Fig. 1. Each of these flexible connections 49, 50 passes alternately around the roller 53 carried by the lower forward cross bar 54 of the main frame and rollers 55 carried by the cross bars 48 of the respective ground roller frames, as previously mentioned, and each flexible connection has its outer terminal wound upon a ratchet roller 56 carried by the respective forward side upright 57 of the main frame. The roller 56 has a controlling ratchet 58 engaged by a pawl 59 of its respective frame upright 57 as seen by comparison of Figs. 1 and 3, and each roller has an operating ratchet 60 engaged by the pawl of an operating lever 61 by which the respective flexible connection 49, 50 may be tightened.

Each of the intermediate belts $a^3$ to $f^3$ is engaged by a belt tightening lever $a^4$ to $f^4$ and each of these belt tighteners is controlled by a flexible connection $a^5$ to $f^5$. Each of the belt tightening levers just above mentioned is pivoted to one of the forward frame uprights 57 and has a rotatably adjustable spool 62 through which the forward end of each respective controlling connection is attached so that the slack may be readily taken up at all times.

The steering of the machine is accomplished by tightening either the belt $a^3$ at one side of the belt $f^3$ at the opposite side, and at the same time releasing the tension upon the several other belts and this is accomplished through the use of a steering post 63 mounted horizontally in an upper rear extension 64 of the main frame and provided with a rear steering wheel 65 adjacent to the driver's seat 40, as particularly seen in Fig. 3. This steering post has a bore through which a pair of flexible connections 66 are extended, the outer rear ends of which extensions are wound upon a revolubly adjustable spool 67 mounted in connection with the steering wheel 65, the forward inner ends of the flexible connections 66 depending from the steering post and around opposite sides of a grooved wheel 68 to the central lower portion of which the inner ends of the flexible connections are secured as at 69. This grooved wheel 68 is revolubly mounted upon the rear end of a steering shaft 70 in connection with a multi-grooved pulley 71 and the forward end of the steering shaft 70 has a pivotal connection at 72 upon an upright extension 73 of the main frame, so that the shaft may swing vertically. The spool 67 is used to take up all slack in the flexible connections 66 and the rear portion of the steering shaft 70 with the pulley 71 is normally held down with the latter permitting free rotation, by a pair of springs 74, whose upper ends are connected by a cross bar 75 extending transversely across the pulley 71 at a point forwardly of the grooved wheel 68. The lower ends of the springs 74 are engaged by flexible connections 76 depending therefrom and passing upwardly and rearwardly around rollers 77 and thence around a transversely disposed winding shaft 78 having an operating lever 79 provided with a pawl 80 in engagement with a stationary notched quadrant 81 so that the tension of springs 74 may be readily controlled and adjusted.

The pulley 71 has four reduced portions of which the foremost, seen at 82, is the smallest, the next rearmost reduced portion 83 being the next larger and the reduced portion 84 next to the reduced portion 83 being of greater diameter than the rearmost reduced portion 85, for a purpose which will be presently described. Around opposite sides of the pulley in its rearmost reduced portion 85 are extended flexible connections 86, whose lower inner ends are secured to a central lowermost point of the reduced portion 85 and whose upper portions are extended vertically through a guide opening in the upper cross bar 87 of the upwardly extending frame portion 64 and are wound upon a revolubly mounted spool 88 whose function is to permit of keeping all slack out of the connections 86.

It will be noted from an inspection of Fig. 3 in particular that the reduced portion 85 of pulley 71 is materially less in diameter than the grooved wheel 68, so that when the latter is rotated by shortening either of the flexible connections 66 through rotation of the steering post 63 in either direction, the entire pulley 71 on the rear end of the steering shaft 70 is rotated and through this rotation the pulley and shaft are shifted vertically against the tension of springs 74 by virtue of the fact that the reduced portion 85 will climb one or the other of the anchored flexible connections 86. By comparison of Figs. 1 and 3, it will be noted that the flexible controlling connections $a^5$ and $f^5$ leading downwardly around certain guide rollers 89 of a series of guide rollers journaled above the cross bar 87, are extending around opposite sides of the reduced portion 84 of pulley 71 and are connected to a central lower point thereof and it will also be noted that by virtue of the fact that this reduced portion is of greater diameter than the reduced portion 85, the upward movement of the pulley, tending as it does to slack the connections, when the reduced portion 85 climbs on the connections 86, will be surpassed by the circumferential rotation of the reduced portion 84 in winding one of the flexible connections $a^5$ or $f^5$ and one of these connections will thus be reduced in length and tightened beyond normal.

There is thus this differential action of certain of the parts which is quite different from the effect of the reduced portions 82 and 83 both of which are less in diameter than the reduced portion 85. The flexible connections $b^5$ and $e^5$ lead downwardly over guide rollers 90 and have connection with the reduced portion 83 while the flexible connections $c^5$ and $d^5$ lead downwardly around guide rollers 91 and have connection with the reduced portion 82, it being obvious that all of these latter flexible connections will be slackened more or less at the same time when the pulley is rotated and thus elevated.

Thus, in operation it is simply necessary for the driver of the machine to take his place upon the seat 40 and with the motor 24 in operation, the machine is started in the first instance by pulling rearwardly upon the lever 39 so as to elevate the belt tightening lever 35 against the main belt 27. This completes the driving connections between the motor and the several ground wheels or rollers, it being understood that all of the intermediate belt tightening levers are under normal operating tension. Thus with the steering wheel 65 in normal position, the machine will proceed in a straight line to accomplish the work in hand, whether it be cultivating, planting, or other field work of a similar nature for which planting devices or cultivating devices may be interchangeably mounted in connection with any suitable portion of the main frame as for instance, cultivating teeth 92, as seen in Fig. 3, controlled by springs 93.

Bearing in mind the controlling of the various parts through flexible connections, it is obvious that through wear and the material changes in climate, adjustment of the effective lengths of the various connections will necessarily be needed from time to time and it is to be noted that provision is made herein to readily accomplish such changes.

When it is desired to turn either to the right or left, the steering wheel 65 is turned accordingly and winds up one or the other of the flexible connections 66 so as to rotate the steering pulley 71. This pulley is thus caused to climb one or the other of the flexible connections 86 and thus more or less slacken all of the directional control connections $a^5$ to $f^5$ with the exception of one of the latter which, by virtue of its winding upon the reduced portion 84 of the pulley 71, is tightened and placed under greater than the normal tension, so that the machine will turn by virtue of the driving of only one of its two extreme sideground rollers or wheels under maximum power, while the other ground rollers of the series are driven with a gradually reduced speed due to resistance overcoming speed.

It is apparent that in addition to the ready control of the machine constructed as shown and described and which in use will avoid packing of the soil, the machine so constructed with a series of ground wheels or rollers independently yieldable in a vertical direction, is adapted to ready effective use, upon uneven, rocky land which would preclude the use of the ordinary tractor drawing a gang of soil working implements.

It is obvious from the foregoing that the rear portion of the main frame may be adjusted vertically through the adjusting spool 22, flexible connection 18 and the wheels 11 to adjust the depth of the frame carried soil working devices 92 and that the flexible connection 18 connected in the manner described to the wheel supports 15, 16 will act to equalize the weight these wheels carry on uneven ground. It is also obvious the spring 17 will act to absorb shocks and thus avoid ready breakage of the parts.

It is further obvious these same functions are present in connection with the adjusting connections at the front of the frame controlling the several ground rollers and including the flexible connections 49 and 50 with their adjusting ratchets 56 and their shock absorbing springs 51.

Thus if any of the rollers, either front or rear, strike abrupt obstructions, the respective spring will act to absorb the shock, but if a roller runs up a more or less gradual incline, there will be comparatively no action of the spring, as the respective controlling connection will shift to compensate for such movement and main even uniform pressure of all of the wheels upon the ground, holding vertical movement of the frame down to a minimum. This equalizing movement in connection with the trailing wheels makes the machine virtually the same as a three wheeled vehicle and takes all twisting strain from the frame. As far as the forward rollers are concerned, their uniform pressure upon, and even contact with, the ground in view of the close relation between the traction and steering of the vehicle, makes the steering very positive at all times.

It will be understood that while for purposes of illustration alone I have shown and described connections of certain form, for instance smooth pulleys and belts, I may and in all probability will, use in practice sprocket wheels and connecting sprocket chains. This is especially true as to the several pulleys 44 and belts 45 before described.

I claim:

1. In a soil working machine of the character described, the combination of a frame, a transverse series of ground engaging wheels or rollers forming the support of the machine, roller frames in which the rollers are disposed, a source of power, power transmitting connections between the said source of power and the series of rollers, and means forming supports for said rollers, permitting the latter to independently yield in vertical directions, including means to tension the said wheels in their vertical movement.

2. In a soil working machine of the character described, a main frame, a transverse series of ground engaging rollers or wheels upon which the frame is supported, a source of power carried by the frame, power transmitting connections between the said source of power and the said rollers, or wheels, and vertically movable frames in which the said rollers or wheels are journaled, having pivotal connections in the main frame to permit the rollers or wheels to independently yield in vertical directions.

3. In a machine of the character described, a main frame, a series of rollers alined transversely in the main frame and on which the latter is supported, a source of power in connection with the main frame, driving connections between the said source of power and the said rollers, including an intermediate shaft, and a series of frames in which the rollers are journaled, having bearings upon the said intermediate shaft whereby to permit of independently yielding movement of the rollers without breaking the driving connections thereof.

4. In a machine of the character described, a main frame, a series of rollers alined transversely in the main frame and on which the latter is supported, a source of power in connection with the main frame, driving connections between the said source of power and the said rollers, including an intermediate shaft, and a series of frames in which the rollers are journaled, having bearings upon the said intermediate shaft, whereby to permit of independently yielding movement of the rollers without breaking the driving connections thereof, and means connecting the several roller carrying frames with the main frame to tension yielding movement of the former.

5. In a machine of the character described, a main frame, a series of rollers alined transversely in the main frame and on which the latter is supported, a source of power in connection with the main frame, driving connections between the said source of power and the said rollers, including an intermediate shaft, and a series of frames in which the rollers are journaled having bearings upon the said intermediate shaft, whereby to permit of independently yielding movement of the rollers without breaking the driving connections thereof, said roller carrying frames having guide rollers, guide rollers mounted on the main frame and a flexible connection extending alternately around the guide rollers of the main frame and the said roller carrying frames, said flexible connection having an adjustable engagement at one end with the main frame and having a spring support at its opposite end as described.

6. In a soil working machine of the character described, a transversely alined series of supporting rollers or wheels, a source of power, driving connections leading independently to the several rollers or wheels and including belts for the several rollers, belt tighteners normally engaging the belts under moderate driving tension, a steering shaft mounted to swing, a multiple pulley rotatable on the said shaft and shiftable therewith, flexible connections leading from the said pulley to the several belt tighteners, a rotatable steering post flexibly connected with the said pulley for rotating the latter, and means for shifting the pulley and the steering shaft during rotation of the pulley as and for the purpose set forth.

7. In a soil working machine of the character described, a transversely alined series of ground engaging rollers forming the support of the machine, a source of power, carried by the machine, driving connections leading from the source of power to the several rollers and including a belt for each of the rollers, a belt tightener movable adjacent to each of the said belts and normally engaging the same under moderate driving tension, a flexible controlling connection for each of the belt tighteners, a multiple pulley having a plurality of reduced portions of different diameters to which the said flexible connections are extended and secured, a swinging steering shaft upon which the said pulley is rotatable, a pair of stationary flexible connections secured to the pulley whereby to cause shifting movement thereof during its rotation, and a rotatable steering post having connection with the pulley for rotating the latter.

8. In a soil working machine of the character described, a transversely alined series of ground engaging rollers forming the support of the machine, a source of power carried by the machine, driving connections leading from the source of power to the several rollers and including a belt for each of the rollers, a belt tightener movable adjacent to each of the said belts and normally engaging the same under moderate driving tension, a flexible controlling connection for each of the belt tighteners, a multiple pulley having a plurality of reduced portions of different diameters to which the said flexible connections are extended and secured, a swinging steering shaft upon which the said pulley is rotatable, a pair of stationary flexible connections secured to the pulley whereby to cause shifting movement thereof during its rotation, and a rotatable steering post having connection with the pulley for rotating the latter, one of the said reduced portions of the pulley being of greater diameter than the others and being also of greater diameter than that portion of the pulley to which the said stationary flexible connections are secured and said first named reduced portion of the pulley being engaged by the flexible connections of the belt tighteners of the two outer rollers of the series of rollers, as and for the purpose set forth.

9. In a soil working machine of the character described, a transversely alined series of ground engaging rollers or wheels forming the support thereof, a source of power, driving connections leading independently to the several rollers and including elements shiftable into and out of the effective position, controlling members for the several elements as mentioned a manually actuated rotatable and bodily shiftable member differentially operating the several controlling members, a steering post having connection with said member to rotate the same, and means to cause bodily shifting movement of the member during rotation thereof.

10. In a soil working machine of the character described, the combination of a frame, a forward series of tractive and steering wheels in the frame, and rear caster wheels, said caster wheels being vertically adjustably connected to the frame, and a flexible connection having movable engagement at spaced points therealong with the caster wheel supports and the main frame, and an adjusting member to which one end of the connection is secured whereby to regulate its effective length for the purpose described.

JAMES T. HICKMAN, Jr.